(12) United States Patent
Patil et al.

(10) Patent No.: US 9,998,945 B2
(45) Date of Patent: Jun. 12, 2018

(54) METHODS AND APPARATUS TO CHANGE PEER DISCOVERY TRANSMISSION FREQUENCY BASED ON CONGESTION IN PEER-TO-PEER NETWORKS

(76) Inventors: Shailesh Patil, Bridgewater, NJ (US); Nilesh N. Khude, Bridgewater, NJ (US); Xinzhou Wu, Monmouth Junction, NJ (US); Junyi Li, Chester, NJ (US)

(*) Notice: Subject to any disclaimer, the term of this patent is extended or adjusted under 35 U.S.C. 154(b) by 139 days.

(21) Appl. No.: 13/307,241

(22) Filed: Nov. 30, 2011

(65) Prior Publication Data
US 2013/0138831 A1 May 30, 2013

(51) Int. Cl.
*H04W 28/02* (2009.01)
*H04W 8/00* (2009.01)
*H04W 84/18* (2009.01)
*H04W 76/04* (2009.01)

(52) U.S. Cl.
CPC ....... *H04W 28/0289* (2013.01); *H04W 8/005* (2013.01); *H04W 76/048* (2013.01); *H04W 76/28* (2018.02); *H04W 84/18* (2013.01)

(58) Field of Classification Search
CPC ........... H04W 28/0289; H04W 76/048; H04W 84/18; H04W 8/005
USPC ...................................................... 709/235
See application file for complete search history.

(56) References Cited

U.S. PATENT DOCUMENTS

| | | | |
|---|---|---|---|
| 6,128,506 A * | 10/2000 | Knutsson et al. ............ 455/522 |
| 7,756,542 B1 * | 7/2010 | Kaiser ................ H04L 41/0816 370/335 |
| 8,107,397 B1 * | 1/2012 | Bagchi et al. ................ 370/254 |
| 8,335,937 B2 * | 12/2012 | Qi et al. ........................ 713/320 |
| 8,660,548 B1 * | 2/2014 | Lambert ........... H04W 52/0206 455/418 |
| 9,014,682 B1 * | 4/2015 | Lambert ........... H04W 52/0206 455/418 |
| 9,288,773 B2 * | 3/2016 | Wu ...................... H04W 52/383 |
| 2003/0074244 A1 | 4/2003 | Braxton |
| 2004/0120320 A1 * | 6/2004 | Farahmand ........ H04Q 11/0005 370/395.4 |
| 2007/0014268 A1 * | 1/2007 | Kim .................. H04W 74/0816 370/338 |

(Continued)

FOREIGN PATENT DOCUMENTS

EP    1113690 A2    7/2001
JP    2001189689 A    7/2001

(Continued)

OTHER PUBLICATIONS

International Search Report and Written Opinion—PCT/US2012/067372—ISA/EPO—Apr. 5, 2013.

(Continued)

*Primary Examiner* — Backhean Tiv
(74) *Attorney, Agent, or Firm* — Arent Fox, LLP & Qualcomm, Incorporated

(57) ABSTRACT

A method, a computer program product, and an apparatus are provided. The apparatus determines a resource congestion level based on signals received on a plurality of resources of a peer discovery channel. In addition, the apparatus adjusts a duty cycle of a peer discovery transmission based on the determined congestion level. Furthermore, the apparatus transmits peer discovery signals at the adjusted duty cycle.

26 Claims, 13 Drawing Sheets

(56) References Cited

U.S. PATENT DOCUMENTS

| | | | |
|---|---|---|---|
| 2007/0058634 A1* | 3/2007 | Gupta | H04L 67/12 370/392 |
| 2007/0171910 A1* | 7/2007 | Kumar | H04L 63/0428 370/392 |
| 2007/0174465 A1* | 7/2007 | Huang | H04W 52/0261 709/227 |
| 2007/0248033 A1* | 10/2007 | Bejerano | H04W 16/08 370/318 |
| 2007/0254728 A1* | 11/2007 | Moallemi | H04B 1/7163 455/574 |
| 2008/0030325 A1* | 2/2008 | Fries | G06K 19/0701 340/539.32 |
| 2008/0126490 A1 | 5/2008 | Ahlenius et al. | |
| 2008/0130483 A1* | 6/2008 | Khandekar | H04L 5/0007 370/208 |
| 2008/0155102 A1 | 6/2008 | Aftelak et al. | |
| 2008/0155117 A1 | 6/2008 | Hu et al. | |
| 2009/0092069 A1* | 4/2009 | Rhee | 370/311 |
| 2009/0287827 A1* | 11/2009 | Horn et al. | 709/227 |
| 2009/0323647 A1 | 12/2009 | Park et al. | |
| 2010/0067421 A1* | 3/2010 | Gorokhov | H04W 52/0216 370/311 |
| 2010/0110999 A1 | 5/2010 | Li et al. | |
| 2010/0134241 A1* | 6/2010 | Gips | H04L 41/12 340/5.1 |
| 2010/0165882 A1 | 7/2010 | Palanki et al. | |
| 2010/0172338 A1* | 7/2010 | Chou | H04W 56/002 370/345 |
| 2010/0267344 A1 | 10/2010 | Guener et al. | |
| 2010/0273419 A1* | 10/2010 | Rajagopal | H04W 72/0426 455/41.2 |
| 2010/0291872 A1 | 11/2010 | Laroia et al. | |
| 2011/0021235 A1 | 1/2011 | Laroia et al. | |
| 2011/0047384 A1* | 2/2011 | Jacobs | G06K 9/00677 713/176 |
| 2011/0085455 A1* | 4/2011 | Wu et al. | 370/252 |
| 2011/0087768 A1* | 4/2011 | Wu | H04L 1/0009 709/224 |
| 2011/0096665 A1* | 4/2011 | McCann | H04L 47/10 370/235 |
| 2011/0106837 A1 | 5/2011 | Walton et al. | |
| 2011/0153773 A1* | 6/2011 | Vandwalle | H04W 8/005 709/217 |
| 2011/0161697 A1* | 6/2011 | Qi | G06F 1/3209 713/320 |
| 2011/0188434 A1* | 8/2011 | Rhee | H04L 12/12 370/311 |
| 2011/0205887 A1* | 8/2011 | Wu et al. | 370/229 |
| 2011/0239226 A1* | 9/2011 | Placanica | 719/313 |
| 2012/0109912 A1* | 5/2012 | Donze et al. | 707/694 |
| 2012/0191966 A1* | 7/2012 | Jovicic | H04W 8/005 713/100 |
| 2012/0269072 A1* | 10/2012 | Wu | H04W 52/242 370/242 |
| 2013/0044685 A1* | 2/2013 | Fong | H04J 11/0053 370/328 |
| 2013/0138831 A1* | 5/2013 | Patil | H04W 8/005 709/235 |
| 2013/0236170 A1* | 9/2013 | Nishitani | H04L 12/2861 398/25 |
| 2013/0250931 A1* | 9/2013 | Abraham | H04W 8/005 370/338 |

FOREIGN PATENT DOCUMENTS

| | | |
|---|---|---|
| JP | 2003018166 A | 1/2003 |
| JP | 2005528014 A | 9/2005 |
| JP | 2007053524 A | 3/2007 |
| WO | 2011053884 A1 | 5/2011 |

OTHER PUBLICATIONS

Wu, X., et al., "FlashLinQ: A synchronous distributed scheduler for peerto-peer ad hoc networks", Communication, Control, and Computing(Allerton), 2010 48th Annual Allerton Conference on, IEEE, Sep. 29, 2010 (Sep. 29, 2010), pp. 514-521, XP031899421, DOI: 10.1109/ALLERTON.2010.5706950, ISBN: 978-1-4244-8215-3.

Lai et al., "On distributed time-dependent shortest paths over duty-cycled wireless sensor networks", in Proc. IEEE INFOCOM 2010, San Diego, CA, USA, Mar. 15-19, 2010.

You et al., "ALOHA-like neighbor discovery in low-duty-cycle wireless sensor networks" in Proc. IEEE WCNC 2011, Cancun, Quintana Roo, pp. 749-754, Mar. 28-31, 2011.

Lee D., et al., "Adaptive Duty-Cycle based Congestion Control for Home Automation Networks", IEEE Transactions on Consumer Electronics, vol. 56, No. 1, pp. 42-47, Feb. 2010.

* cited by examiner

METHODS AND APPARATUS TO CHANGE PEER DISCOVERY TRANSMISSION FREQUENCY BASED ON CONGESTION IN PEER-TO-PEER NETWORKS

BACKGROUND

Field

The present disclosure relates generally to communication systems, and more particularly, to changing peer discovery transmission frequency based on congestion in peer-to-peer networks.

Background

In an ad hoc peer-to-peer wireless network, peers may discover each other by transmitting a peer discovery signal on a peer discovery resource. The presence of a peer may be detected by listening for the peer discovery signal of the peer on the peer discovery resource allocated to the peer. The allocated peer discovery resource may be an orthogonal time frequency block that allows receiving peers to distinguish the received peer discovery signals.

In an ad hoc peer-to-peer wireless network, there is no centralized authority to assign the peer discovery resources to the peers. As such, peers must select their peer discovery resources on which to transmit their peer discovery signals. The peer discovery resources may become congested such that peers transmit in the same peer discovery resources as other peers. As such, a need exists for a method and an apparatus that reduces the overall congestion on the peer discovery resource.

SUMMARY

In an aspect of the disclosure, a method, a computer program product, and an apparatus are provided. The apparatus determines a resource congestion level based on signals received on a plurality of resources of a peer discovery channel. In addition, the apparatus adjusts a duty cycle of a peer discovery transmission based on the determined congestion level. Furthermore, the apparatus transmits peer discovery signals at the adjusted duty cycle.

DETAILED DESCRIPTION

Figure 1:
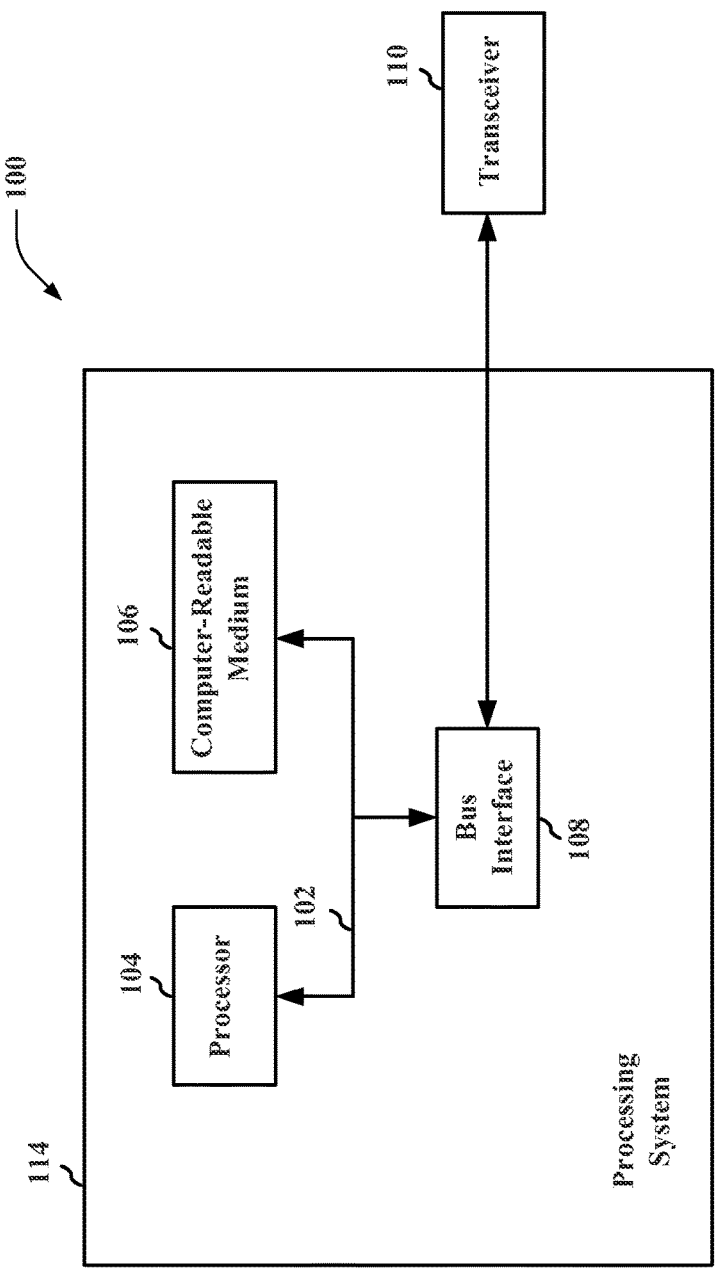
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
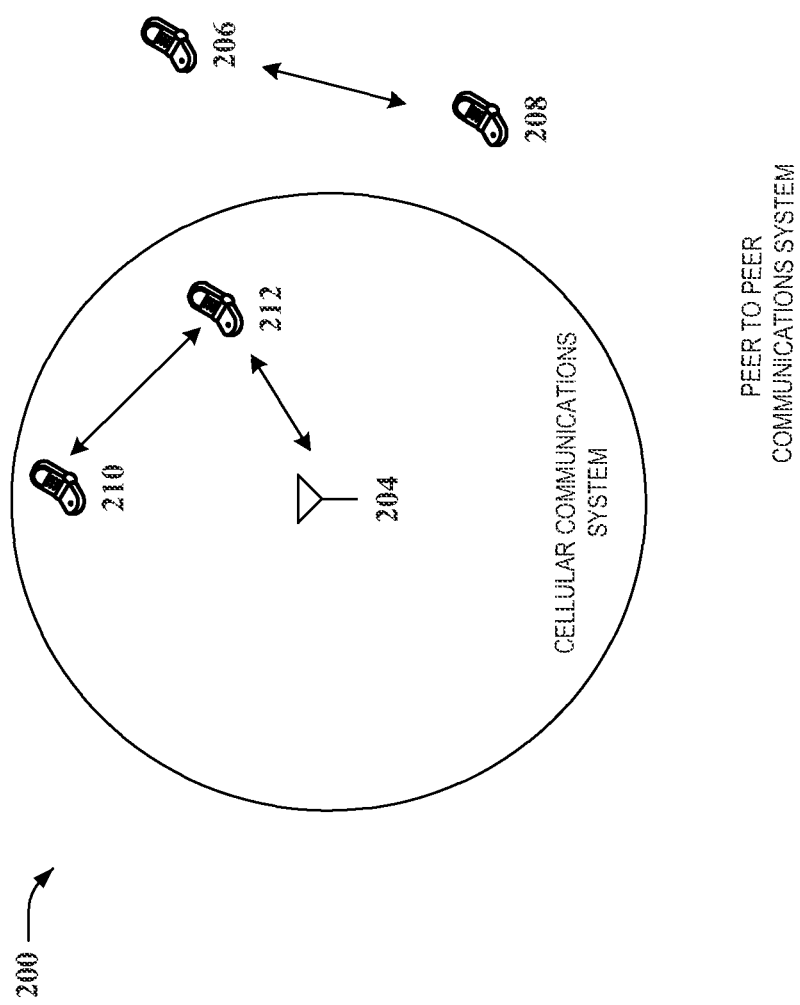
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
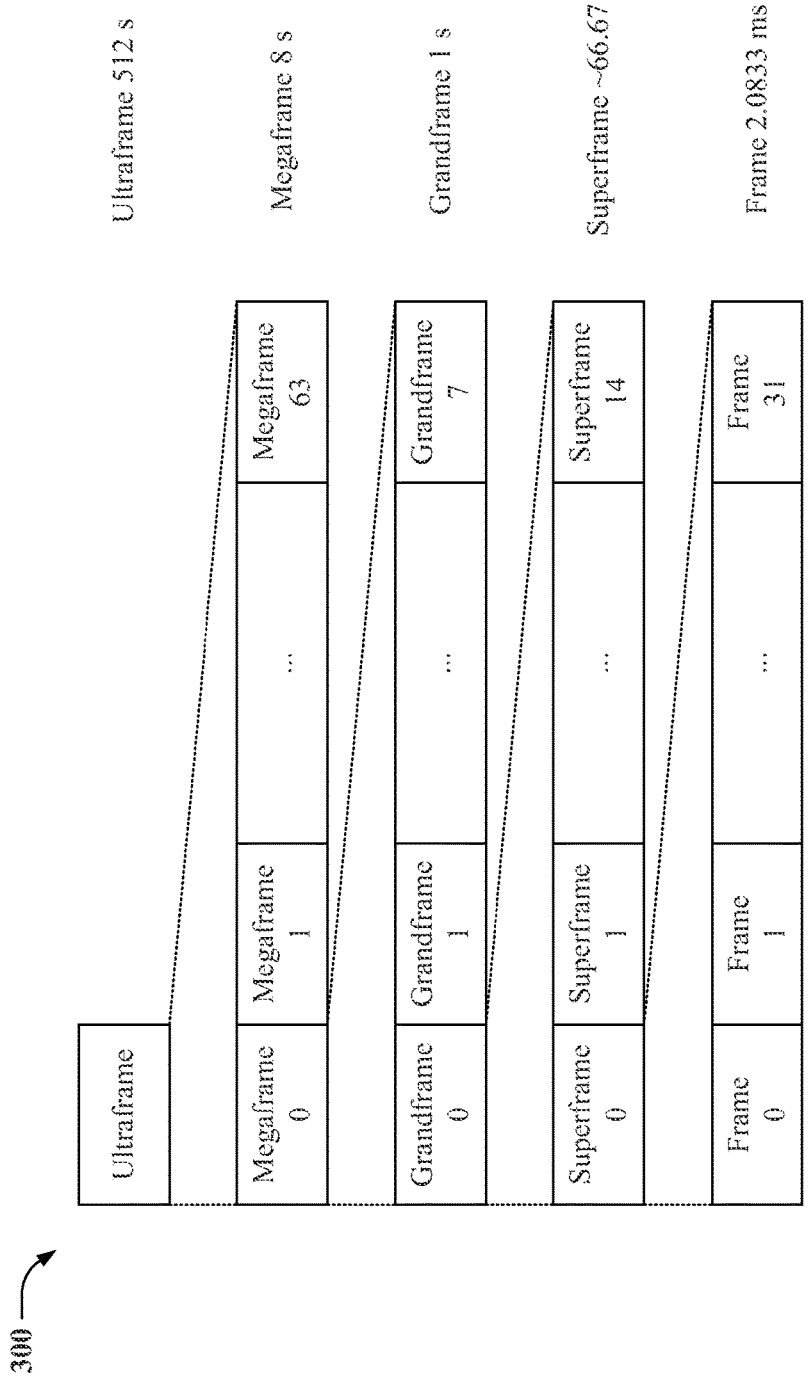
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
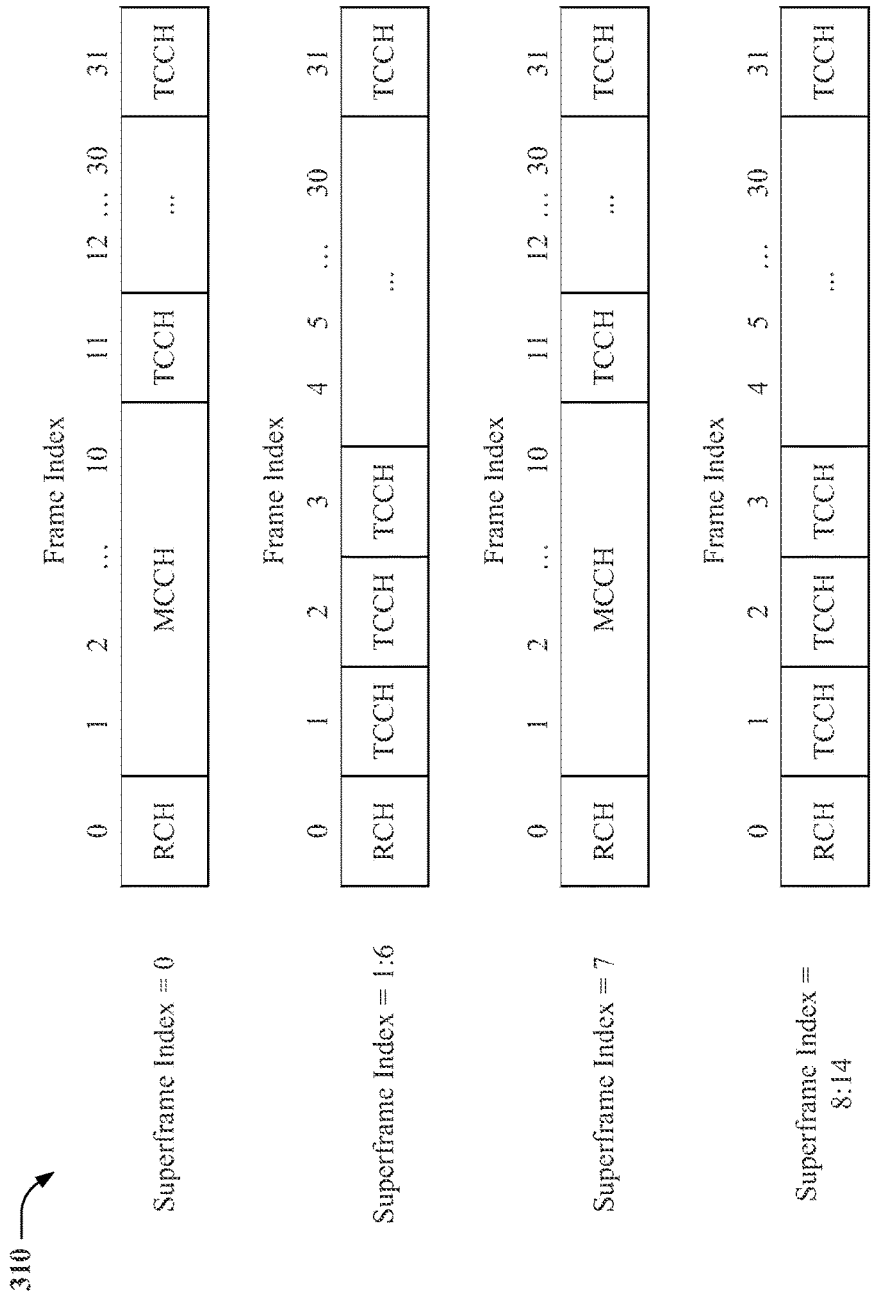
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
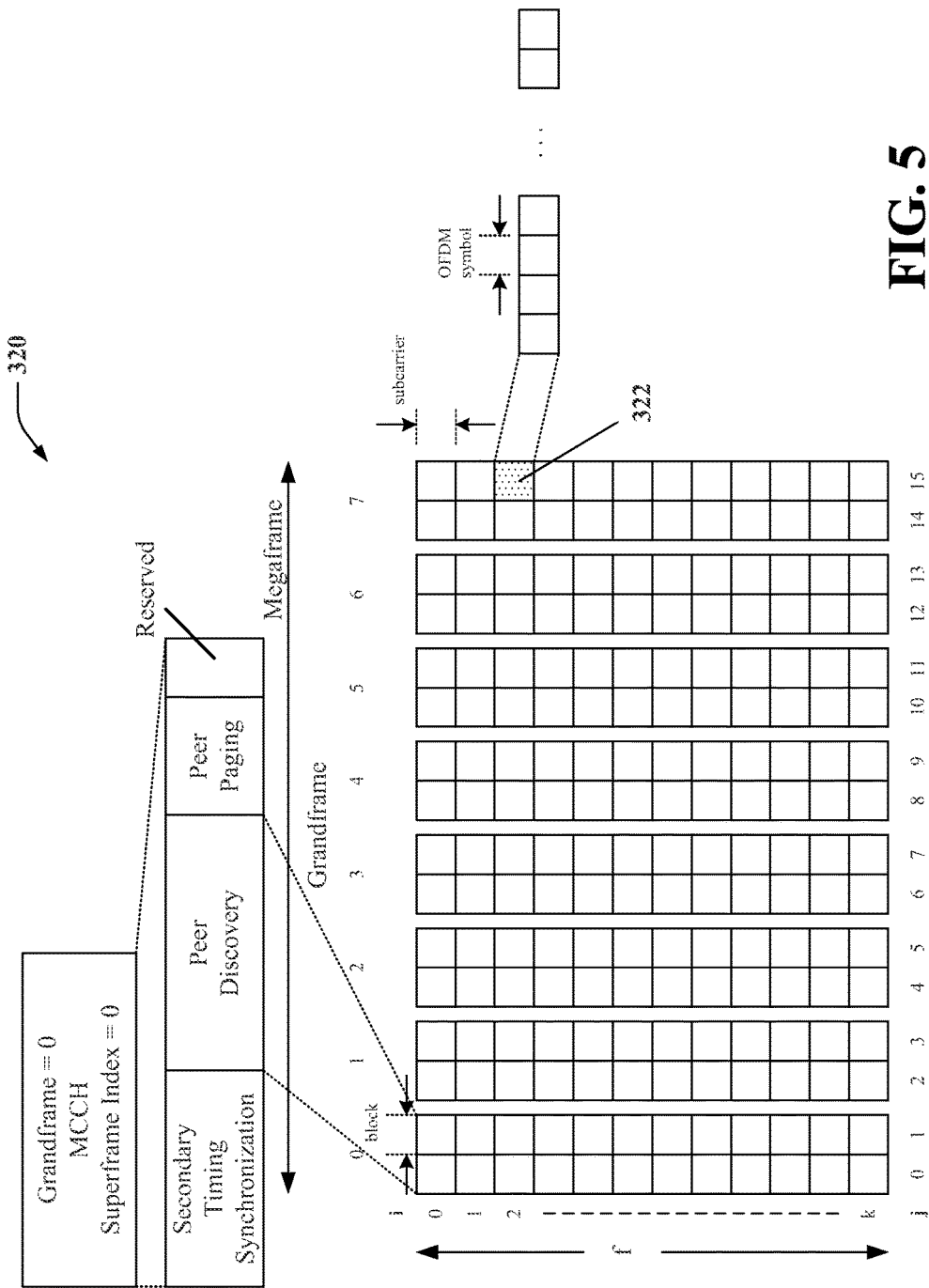
FIG. 5 is a diagram illustrating an operation timeline of a miscellaneous channel and a structure of a peer discovery channel.

FIG. 5 is a diagram 320 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequencydivision multiplexing (OFDM) symbols (e.g., 72) at the same subcarrier. FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 322 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens, subject to constraints such as half duplex constraints, for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding its PDRID and the detected energies on the other peer discovery resources corresponding to other PDRIDs.

Figure 6:
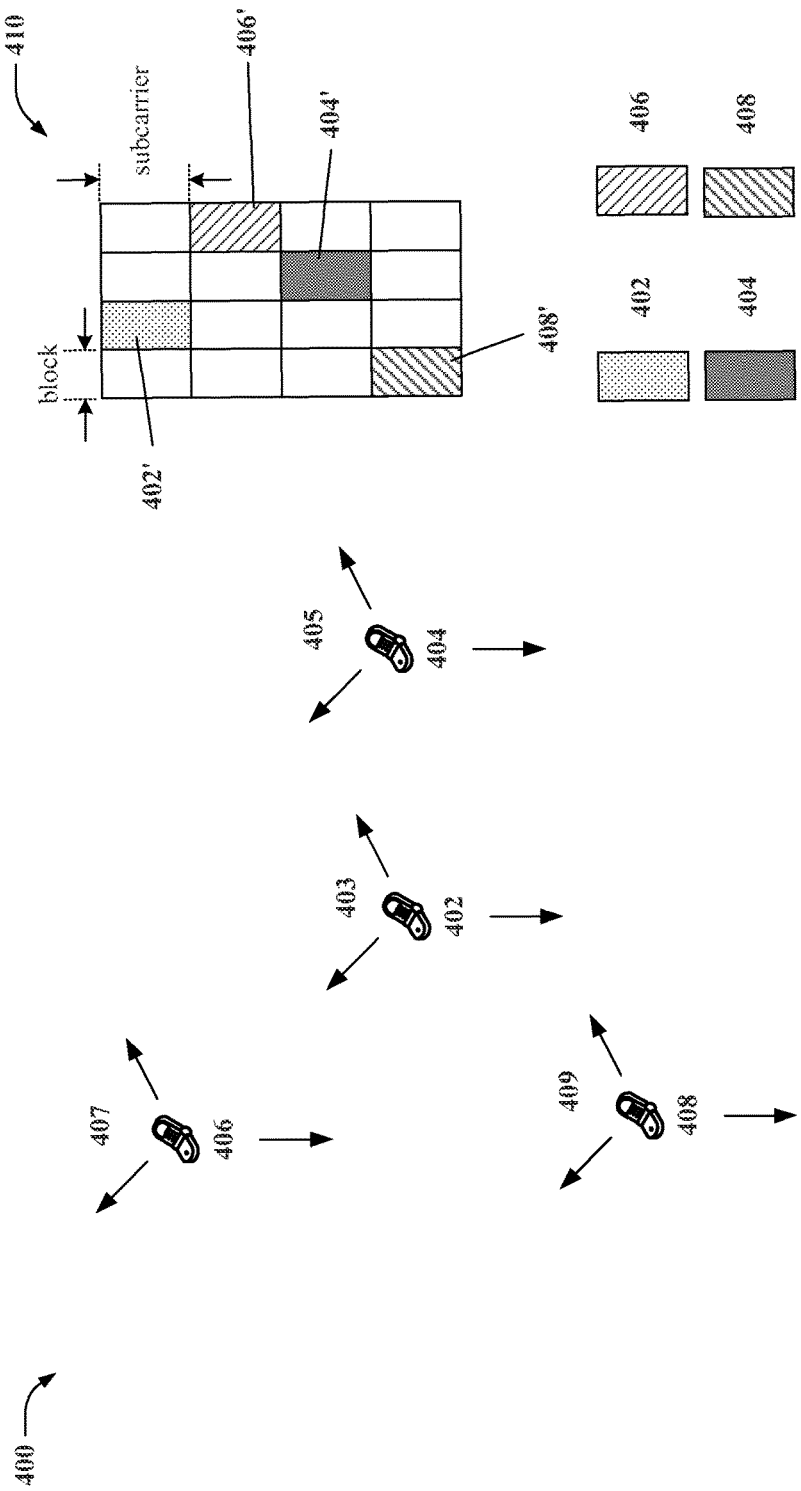
FIG. 6 is a first diagram for illustrating an exemplary method.

FIG. 6 is a first diagram 400 for illustrating an exemplary method. As shown in FIG. 6, the wireless device 402 transmits a peer discovery signal 403 in the peer discovery resource 402', the wireless device 404 transmits a peer discovery signal 405 in the peer discovery resource 404', the wireless device 406 transmits a peer discovery signal 407 in the peer discovery resource 406', and the wireless device 408 transmits a peer discovery signal 409 in the peer discovery resource 408'. Each of the individual peer discovery resources of the peer discovery channel 410 may include a plurality of resource elements, each of which may extend over one or more OFDM symbols and one or more subcarriers. For example, each individual peer discovery resource may be a block that extends over a plurality of OFDM symbols (e.g., 72 OFDM symbols) at a particular subcarrier.

According to the exemplary method, the wireless device 402 determines a peer discovery resource congestion level of the peer discovery resources based on peer discovery signals 405, 407, 409 received on the plurality of peer discovery resources of a peer discovery channel 410 from the wireless devices 404, 406, 408, respectively. The wireless device 402 determines the peer discovery resource congestion level of the peer discovery resources by measuring an energy received in each of the individual peer discovery resources. The wireless device 402 measures an energy received in each individual peer discovery resource by measuring an energy received on each tone (i.e., an OFDM symbol at a subcarrier) of the peer discovery resource. Due to the half-duplex nature of the wireless device 402 (i.e., unable to transmit and receive at the same time), the wireless device 402 may refrain on a slower time scale from transmitting its peer discovery signal in its allocated peer discovery resource 402' so that the wireless device 402 can determine an energy received in its own peer discovery resource 402' and in peer discovery resources concurrent in time (i.e., at the same OFDM symbols) to its allocated peer discovery resource 402'. The wireless device 402 adjusts a frequency of a peer discovery transmission based on the determined congestion level and the wireless device 402 transmits peer discovery signals 403 at the adjusted frequency. The wireless device 402 may inform the wireless devices 404, 406, 408 of the change in the frequency of peer discovery transmissions by including information in the peer discovery signal 403 (e.g., using pilots) that indicates the frequency at which the peer discovery signal 403 is transmitted. Based on the frequency information, the wireless devices 404, 406, 408 will be able to ascertain whether a lack of receiving the peer discovery signal 403 is due to a change in the frequency of the transmission of the peer discovery signal 403 or due to the wireless device 402 moving out of the area or going offline.

The wireless device 402 adjusts the frequency of its peer discovery transmission by adjusting a duty cycle of the peer discovery transmission. The frequency information included in the peer discovery transmission may include at least one of the periodicity (or the period), the duty cycle, and an offset from a particular reference frame, such as for example, a particular reference megaframe. The periodicity indicates the period at which the allocated peer discovery resource repeats, the duty cycle is the fraction of peer discovery resource occurrences utilized within the period, and the offset indicates when the period begins for the first peer discovery transmission. For example, if the wireless device 402 transmits a peer discovery signal in all megaframes except megaframes 4n for n=0, 1, 2, . . . , 15 (see FIG. 3), then the period would be 4 (periodicity ¼), the duty cycle ¾, and the offset 1.

Figure 7:
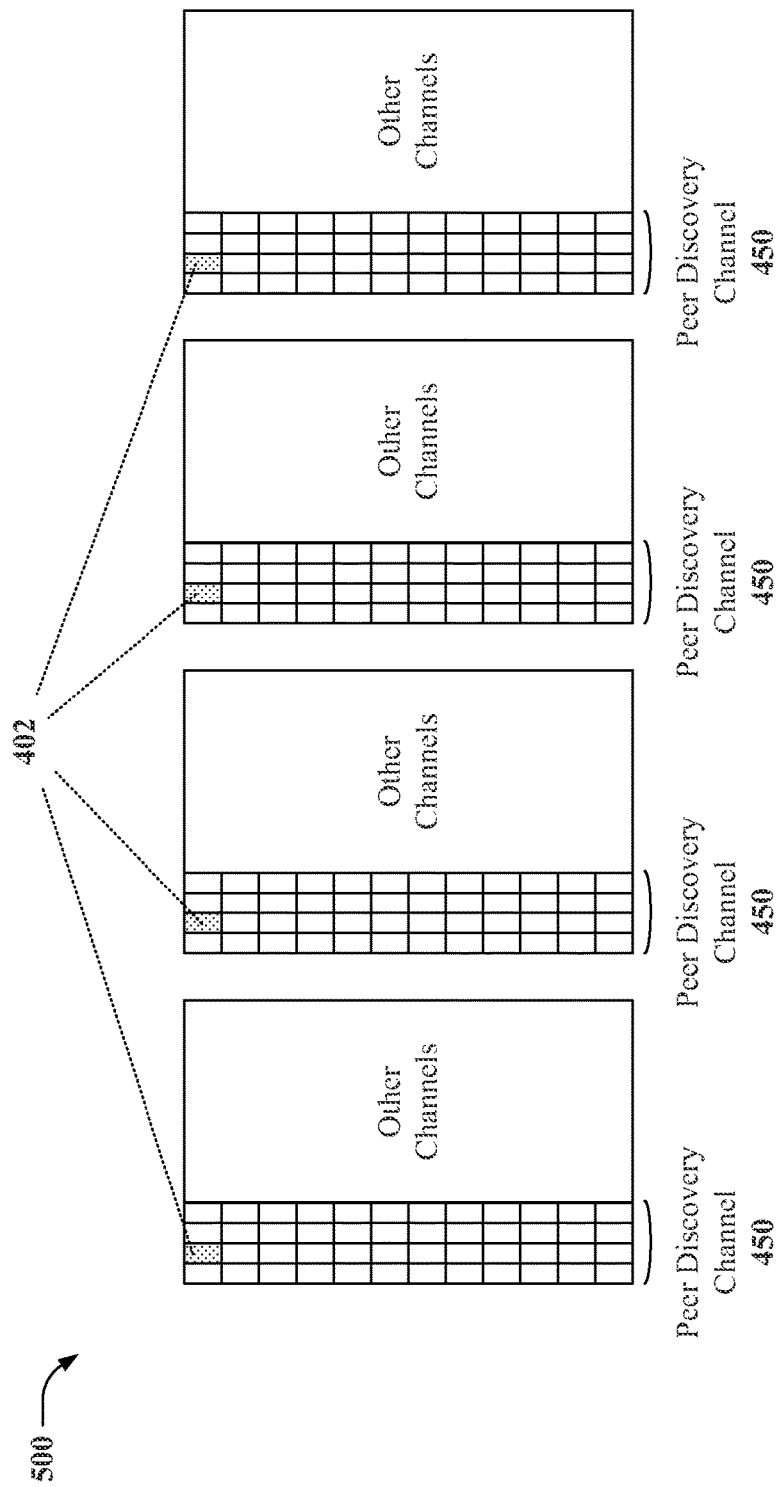
FIG. 7 is a second diagram for illustrating the exemplary method.

FIG. 7 is a second diagram 500 for illustrating the exemplary method. As shown in FIG. 7, the wireless device 402 transmits in each peer discovery channel 450. In a heavy load scenario, each of the peer discovery resources (i.e., each block) may be utilized by a wireless device to transmit its peer discovery signal. Further, some of the peer discovery resources may be utilized by multiple wireless devices (which reduces the range of peer discovery). According to the exemplary method, the wireless device 402 estimates the load on the peer discovery channels 450 by evaluating the received energy on each of the peer discovery resources. Alternatively or in addition, the wireless device 402 may estimate the load on the peer discovery channels 450 based on the frequency information decoded from the peer discovery signals received on the plurality of peer discovery resources. As discussed supra, due to the half-duplex nature of the wireless device 402, the wireless device 402 may occasionally refrain from transmitting on its allocated peer discovery resource in order to estimate the load on its allocated peer discovery resource and peer discovery resources that are concurrent in time (i.e., same OFDM symbols) as its allocated peer discovery resource. Based on the determined peer discovery resource congestion level, the wireless device 402 adjusts the frequency at which the wireless device 402 transmits its peer discovery signal.

Figure 8:
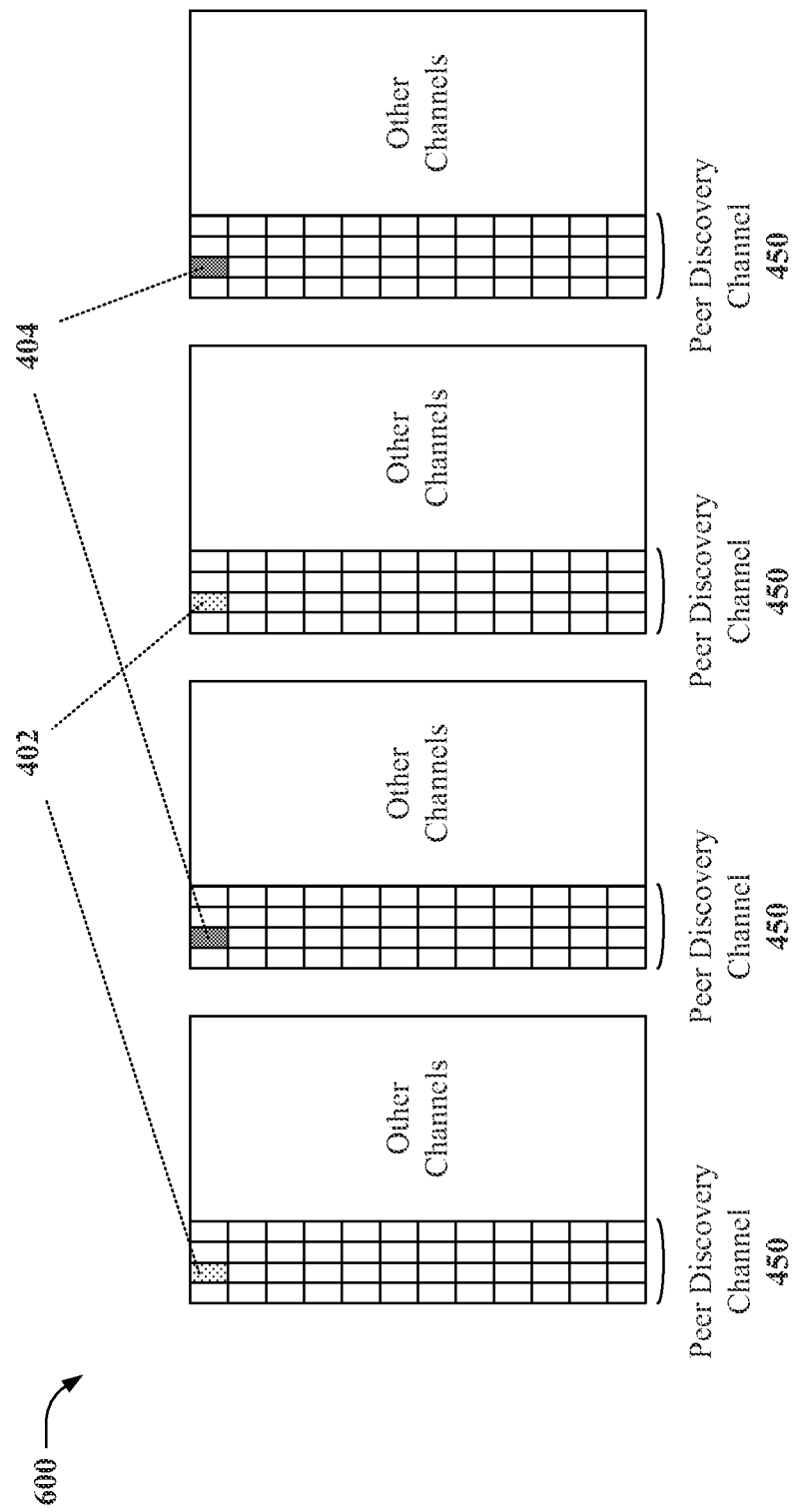
FIG. 8 is a third diagram for illustrating the exemplary method.

FIG. 8 is a third diagram 600 for illustrating the exemplary method. The wireless device 402 may compare the determined peer discovery resource congestion level to a first threshold and adjust the frequency (duty cycle) of transmitting its peer discovery signal based on the comparison. For example, if the wireless device 402 determines that the peer discovery resources have a utilization greater than 90%, the wireless device 402 may determine to reduce the frequency of transmitting its peer discovery signal. If the wireless device 402 is not utilizing all of the available recurrences of peer discovery resource in the peer discovery channel 450 (e.g., upon reducing the frequency of transmitting its peer discovery signal), the wireless device may increase the frequency of transmitting its peer discovery signal based on whether the peer discovery resource congestion level is less than a second threshold. For example, after decreasing the frequency of transmitting its peer discovery signal, if the wireless device 402 determines that the peer discovery resources have a utilization less than 70% and the recurring peer discovery resource assigned to it is unutilized by any device for certain recurrences, the wireless device 402 may determine to increase the frequency of transmitting its peer discovery signal.

Assume that the wireless devices 402, 404 are transmitting their peer discovery signals in the same peer discovery resources (i.e., they have the same PDRID). By transmitting in the same peer discovery resources, the wireless devices 402, 404 will not be able to discover each other and their range of discovery may be reduced if they are close together. As shown in FIG. 8, the wireless device 402, upon determining the congestion level to be greater than a first threshold, has reduced the frequency of its peer discovery transmissions, as the wireless device 402 transmits its peer discovery signal in every other available peer discovery channel 450. Furthermore, the wireless device 404, upon determining a peer discovery resource congestion level based on peer discovery signals received on the plurality of peer discovery resources of the peer discovery channels 450, has reduced the frequency of its peer discovery transmissions, as the wireless device 404 also transmits its peer discovery in every other available peer discovery channel 450. The wireless devices 402, 404 have interleaved their transmissions based on their own determinations of the peer discovery resource congestion and comparisons with a threshold (which may be different for each wireless device). The orthogonal time multiplexing of the peer discovery resources has an advantage over the wireless device 402, 404 transmitting on the same peer discovery resources, as the range of discovery for the wireless devices 402, 404 will not be impacted and the wireless devices 402, 404 can discover each other.

As discussed supra, the wireless devices may adjust the frequency of peer discovery transmissions by reducing the frequency of peer discovery signal transmissions when the determined peer discovery congestion level is greater than a first threshold, and by increasing the frequency when the determined peer discovery congestion level is less than a second threshold. The first and second thresholds may be different for each of the wireless devices. In one configuration, the first and second thresholds may be based on an assigned transmission priority. That is, the wireless device 402 may have a high assigned transmission priority such that the first threshold is 95% and the second threshold is 75% and the wireless device 404 may have a lower assigned transmission priority such that the first threshold is 90% and the second threshold is 70%. The assigned transmission priority may be based on a paid subscription or on other factors. In another configuration, the first and second thresholds may be based on an intended range of the peer discovery signal. For example, when the peer discovery signals are intended for short range (e.g., detecting a local printer or desktop computer) as opposed to long range, the first threshold may be 100% and the second threshold 0% such that the frequency is never adjusted. In another configuration, the first and second thresholds may be a function of at least one of the periodicity or the duty cycle. For example, when the duty cycle of the peer discovery transmissions from the wireless device 402 is ½, the first threshold may be 95% rather than 90% so that further reductions in the frequency of peer discovery transmissions require a higher resource congestion level.

Rather than base the first and second thresholds on the transmission priority or the intended range of the peer discovery signal, the amount by which the wireless device 402 adjusts the frequency of its peer discovery transmission may be based on the transmission priority or the intended range of the peer discovery signals. For example, when the intended range of peer discovery is short, the wireless device 402 may refrain from adjusting the frequency of its peer discovery transmissions or may adjust the frequency by a small amount, and when the intended range of peer discovery is large, the wireless device 402 may adjust the frequency of its peer discovery transmissions by a larger amount. For another example, the transmission priority may include a plurality of levels such that a wireless device that is assigned a high priority does not adjust the frequency of its peer discovery transmissions, while a wireless device that is assigned a medium priority adjusts the frequency of its peer discovery transmissions by ⅓, and wireless device that is assigned a low priority adjusts the frequency of its peer discovery transmissions by ⅔.

Figure 9:
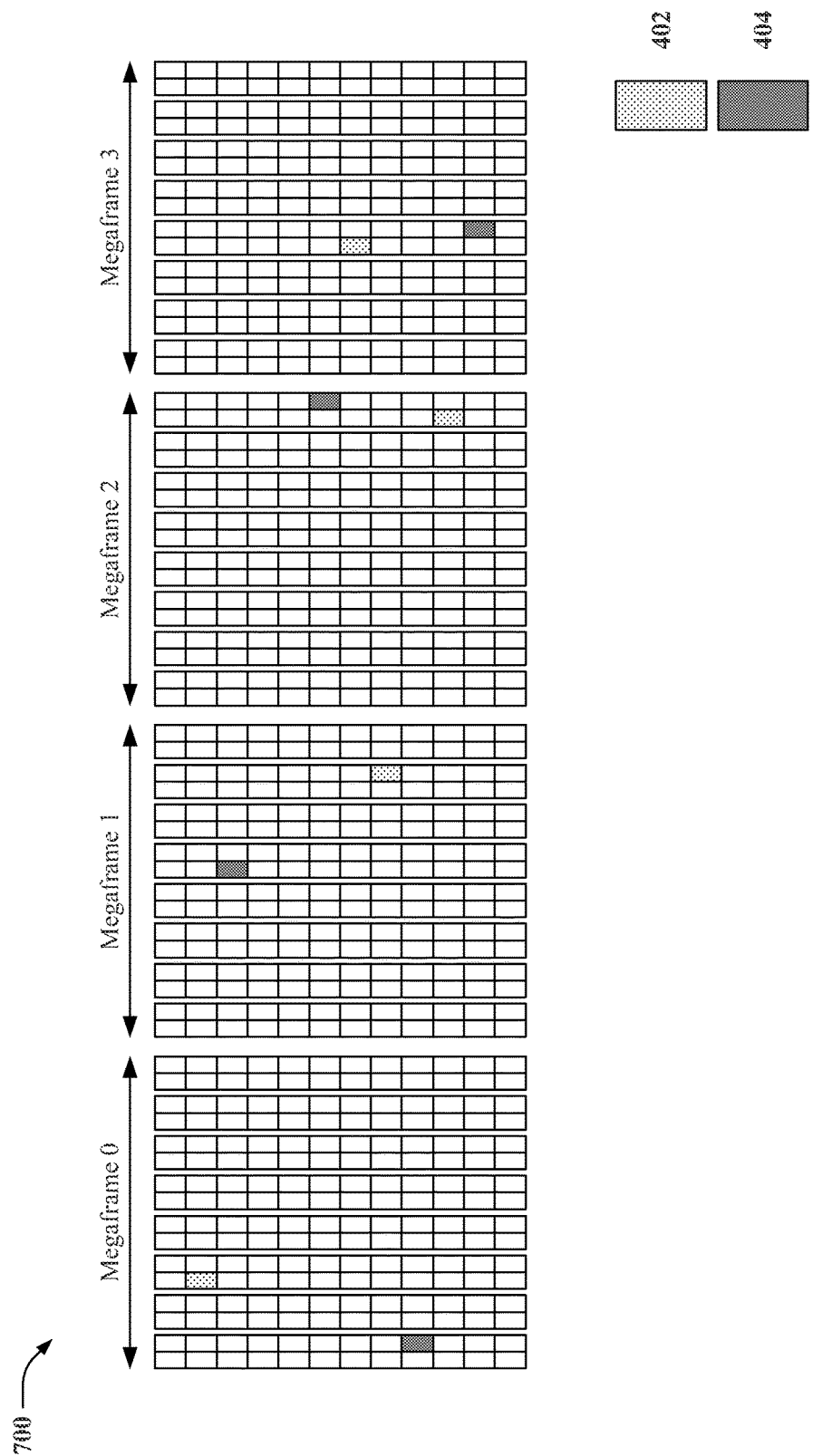
FIG. 9 is a first diagram for illustrating the exemplary method within FlashLinQ.

FIG. 9 is a first diagram 700 for illustrating the exemplary method within FlashLinQ. As discussed in relation to FIG. 5, wireless devices are allocated a block in each megaframe. The particular block allocated is based on the PDRID selected by the wireless device. In each megaframe, the allocated block may hop to different positions at different subcarriers. As shown in FIG. 9, the wireless devices 402, 404 are allocated a block in each of the megaframes.

Figure 10:
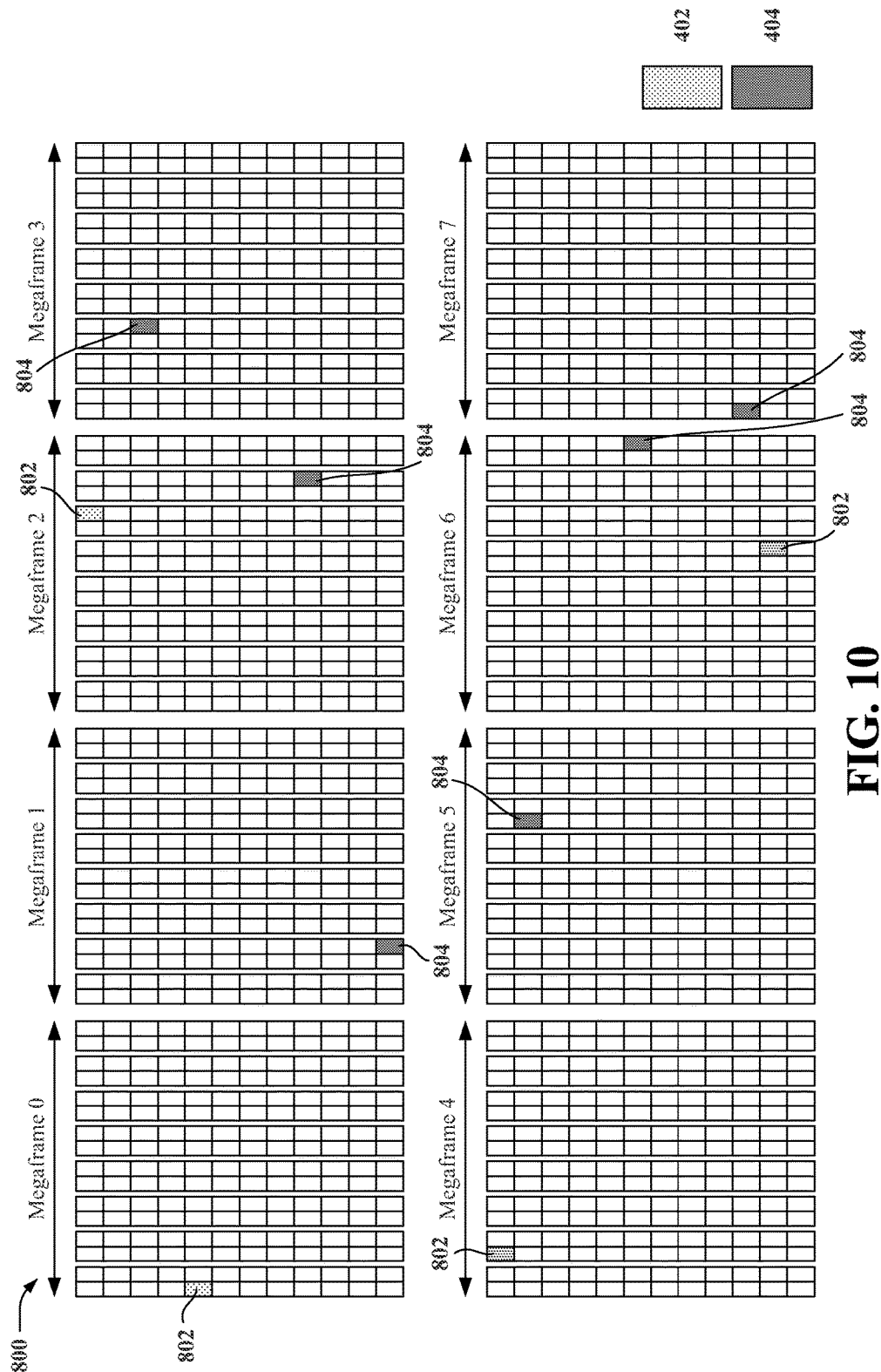
FIG. 10 is a second diagram for illustrating the exemplary method within FlashLinQ.

FIG. 10 is a second diagram 800 for illustrating the exemplary method within FlashLinQ. Each of the wireless device 402, 404 determine a peer discovery resource congestion level based on signals received on the plurality of resources of the peer discovery channels in each megaframe. Based on the determined peer discovery resource congestion level, the wireless devices 402, 404 adjust a frequency of peer discovery transmissions. Assume the wireless device 404 has a higher transmission priority than the wireless device 402 (such as for example, through a higher paid subscription) and, if a reduction in the peer discovery transmission frequency is required, wireless devices with a higher transmission priority reduce by 25% while wireless devices with a lower transmission priority reduce by 50%. Assume also that the peer discovery resources are 95% utilized. The wireless device 402 determines that the 95% utilization is greater than the first threshold of 90% and therefore determines to reduce the frequency of transmitting its peer discovery signal by 50%, with a periodicity of ½ (period 2), a duty cycle of ½, and an offset of 0. On its allocated resources 802, the wireless device 402 transmits its peer discovery signal with information indicating the periodicity (or period), the duty cycle, and the offset. The wireless device 404 determines that the 95% utilization is greater than the first threshold of 90% and therefore determines to reduce the frequency of transmitting its peer discovery signal by 25%, with a periodicity of ¼ (period 4), a duty cycle of ¾, and an offset of 1. On its allocated resources 804, the wireless device 404 transmits its peer discovery signal with information indicating the periodicity (or period), the duty cycle, and the offset.

Figure 11:
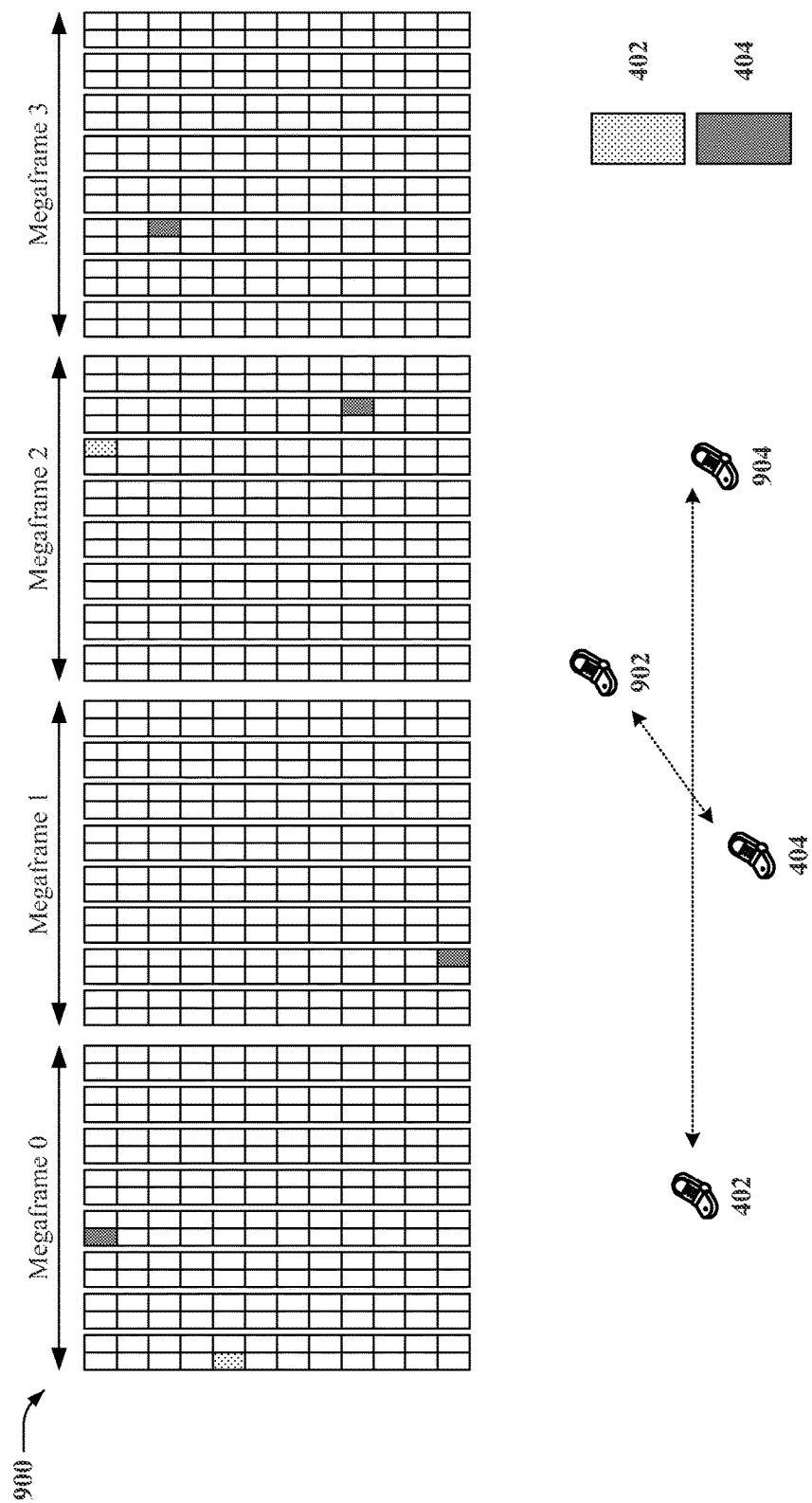
FIG. 11 is a third diagram for illustrating the exemplary method within FlashLinQ.

FIG. 11 is a third diagram 900 for illustrating the exemplary method within FlashLinQ. As shown in FIG. 11, the wireless device 404 intends to engage in short range peerto-peer communication while the wireless device 402 intends to engage in long range peer-to-peer communication. Assume the wireless device 404 determines that the peer discovery resources are congested to a level greater than a first threshold. Because the wireless device 404 intends only for short range peer-to-peer communication, the wireless device 404 does not reduce its frequency of peer discovery transmissions. Assume the wireless device 402 also determines that the peer discovery resources are congested to a level greater than a first threshold. Because the wireless device 402 intends for long range peer-to-peer communication, the wireless device 402 reduces its frequency of transmissions by transmitting only in the even megaframes (period 2, duty cycle ½, offset 0). Generally, wireless devices with a short intended range may be required to reduce their peer discovery transmissions to a lesser extent than wireless devices with a long intended range.

Figure 12:
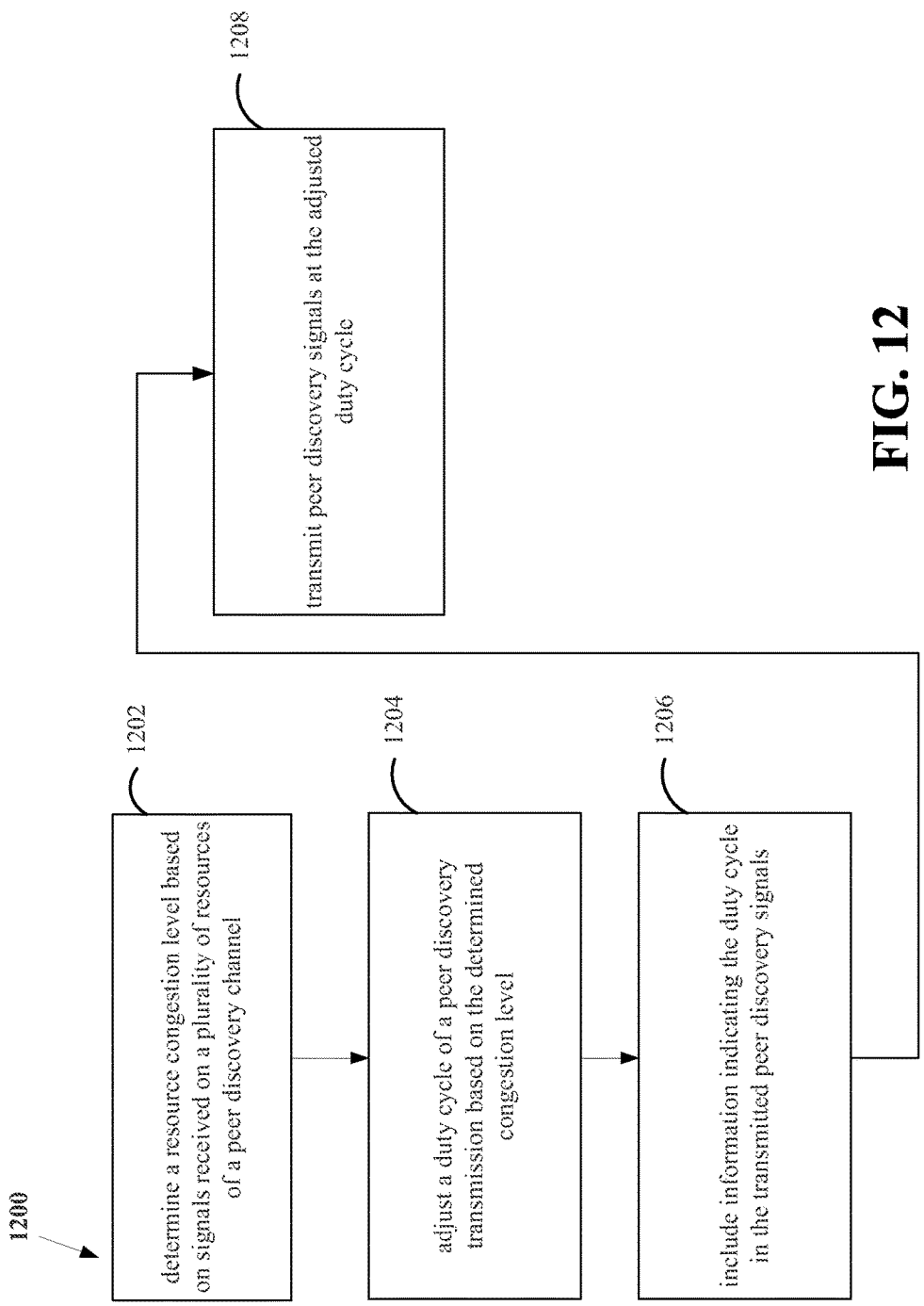
FIG. 12 is a flow chart of a method of wireless communication.

FIG. 12 is a flow chart 1200 of a method of wireless communication. The method is performed by a wireless device. As shown in FIG. 12, the wireless device determines a resource congestion level based on signals received on a plurality of resources of a peer discovery channel (1202). Based on the determined congestion level, the wireless device adjusts a duty cycle of a peer discovery transmission (1204). The wireless device transmits peer discovery signals at the adjusted duty cycle (1208). In order to inform other wireless devices of the adjusted duty cycle of peer discovery transmissions, the wireless device may include information indicating the duty cycle in the transmitted peer discovery signals (1206). The wireless device may also include information indicating the periodicity and the offset in the transmitted peer discovery signals.

The congestion level may be determined based on at least one of a determined energy on each of the plurality of resources or on information decoded from the signals received on the plurality of resources (e.g., periodicity and duty cycle information). In one configuration, the wireless device may adjust the duty cycle (1204) by reducing the duty cycle when the determined congestion level is greater than a first threshold, and by increasing the duty cycle when the determined congestion level is less than a second threshold. In such a configuration, the first threshold and the second threshold may be based on an assigned transmission priority. Furthermore, the first threshold and the second threshold may be a function of at least one of a periodicity or the duty cycle.

The wireless device may adjust the duty cycle (1204) further based on at least one of a transmission priority or an intended range of peer-to-peer communications. In one configuration, when wireless device adjusts the duty cycle (1204) further based on the transmission priority, the transmission priority includes a plurality of priority levels, and the duty cycle is adjusted differently based on an assigned transmission priority of the plurality of priority levels.

Figure 13:
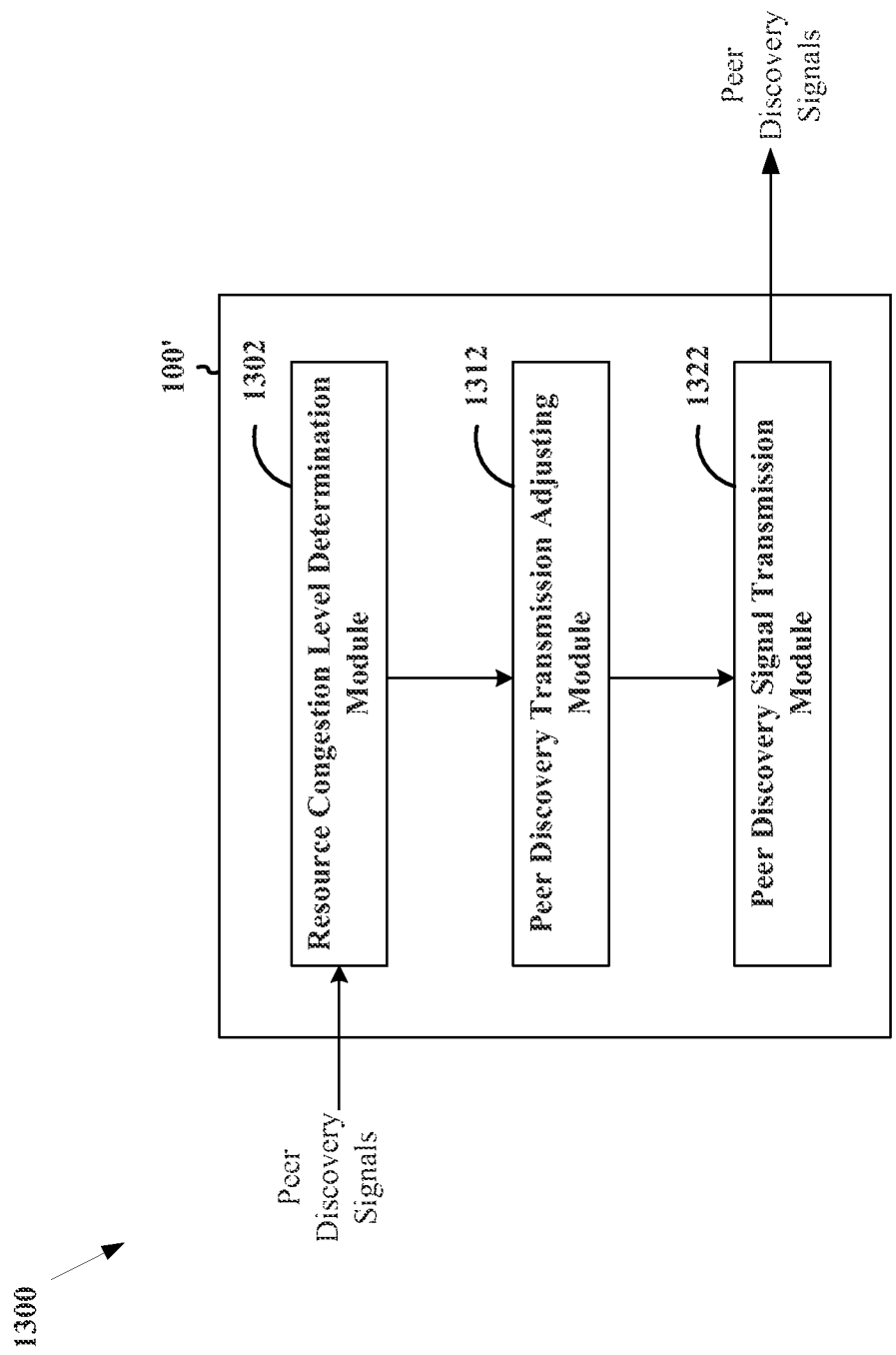
FIG. 13 is a conceptual block diagram illustrating the functionality of an exemplary apparatus.

FIG. 13 is a conceptual block diagram 1300 illustrating the functionality of an exemplary apparatus 100'. The apparatus includes a resource congestion level determination module 1302 that is configured to determine a resource congestion level based on peer discovery signals received on a plurality of resources of a peer discovery channel. The determined congestion level is provided to a peer discovery transmission adjusting module 1312 that is configured to determine how to adjust a duty cycle of a peer discovery transmission based on the determined congestion level. The adjustment information is provided to the peer discovery signal transmission module 1322, which is configured to transmit peer discovery signals at the adjusted duty cycle.

In one configuration, the peer discovery signal transmission module 1322 is configured to include information indicating the periodicity and the duty cycle in the transmitted peer discovery signals. In one configuration, the resource congestion level determination module 1302 is configured to determine the congestion level based on at least one of a determined energy on each of the plurality of resources or on information decoded in the signals received on the plurality of resources.

In one configuration, the peer discovery transmission adjusting module 1312 is configured to adjust the duty cycle by reducing the duty cycle when the determined congestion level is greater than a first threshold, and by increasing the duty cycle when the determined congestion level is less than a second threshold. In one configuration, the peer discovery transmission adjusting module 1312 is configured to set the first threshold and the second threshold based on an assigned transmission priority. In addition, in one configuration, the peer discovery transmission adjust module 1312 is configured to set the first threshold and the second threshold based on at least one of the periodicity or the duty cycle.

In one configuration, the peer discovery transmission adjusting module 1312 is configured to adjust the duty cycle further based on at least one of a transmission priority or an intended range of peer-to-peer communications. In such a configuration, when the peer discovery transmission adjusting module 1312 adjusts the duty cycle further based on the transmission priority, the transmission priority includes a plurality of priority levels, and the peer discovery transmission adjusting module 1312 is configured to adjust the duty cycle differently based on an assigned transmission priority of the plurality of priority levels. The apparatus may include additional modules that perform each of the steps in the aforementioned flow chart of FIG. 12. As such, each step in the aforementioned flow chart may be performed by a module and the apparatus may include one or more of those modules.

Referring to FIG. 1 and FIG. 13, in one configuration, the apparatus 100/100' for wireless communication includes means for determining a resource congestion level based on signals received on a plurality of resources of a peer discovery channel, means for adjusting a duty cycle of a peer discovery transmission based on the determined congestion level, and means for transmitting peer discovery signals at the adjusted duty cycle. The apparatus may further include means for including information indicating a periodicity and the duty cycle in the transmitted peer discovery signals. The aforementioned means are the modules of FIG. 13 and/or the processing system 114 of FIG. 1 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a wireless communication device, comprising:
   determining a resource congestion level based on signals received on a plurality of resources of a peer discovery channel;
   adjusting a duty cycle of a peer discovery transmission based on the determined congestion level on the resources of the peer discovery channel and based on an intended range of peer-to-peer communications between the wireless communication device and a second wireless communication device that receives the peer discovery transmission, wherein the duty cycle is a fraction of peer discovery resource occurrences utilized within a period to repeatedly transmit a peer discovery signal; and
   transmitting the peer discovery signals for the intended range at the adjusted duty cycle, wherein the transmitted peer discovery signals include information indicating the adjusted duty cycle, the period at which the resource of the peer discovery channel allocated to the wireless communication device repeats, and an offset from a reference frame that indicates when the period begins for a first peer discovery transmission.

2. The method of claim 1, wherein the congestion level is determined based on at least one of a determined energy on each of the plurality of resources or on information decoded from the signals received on the plurality of resources.

3. The method of claim 1, wherein the adjusting the duty cycle comprises:
   reducing the duty cycle when the determined congestion level is greater than a first threshold; and
   increasing the duty cycle when the determined congestion level is less than a second threshold.

4. The method of claim 1, wherein the adjusting the duty cycle is further based on a transmission priority, the transmission priority comprises a plurality of priority levels, and the duty cycle is adjusted differently based on an assigned transmission priority of the plurality of priority levels.

5. The method of claim 1, wherein the intended range determines an amount by which the duty cycle of the peer discovery transmission is adjusted.

6. An apparatus for wireless communication, comprising:
   means for determining a resource congestion level based on signals received on a plurality of resources of a peer discovery channel;
   means for adjusting a duty cycle of a peer discovery transmission based on the determined congestion level on the resources of the peer discovery channel and based on an intended range of peer-to-peer communications between the wireless communication device and a second wireless communication device that receives the peer discovery transmission, wherein the duty cycle is a fraction of peer discovery resource occurrences utilized within a period to repeatedly transmit a peer discovery signal; and
   means for transmitting the peer discovery signals for the intended range at the adjusted duty cycle, wherein the transmitted peer discovery signals include information indicating the adjusted duty cycle, the period at which the resource of the peer discovery channel allocated to the apparatus repeats, and an offset from a reference frame that indicates when the period begins for a first peer discovery transmission.

7. The apparatus of claim 6, further comprising means for including information indicating a periodicity and the duty cycle in the transmitted peer discovery signals.

8. The apparatus of claim 6, wherein the congestion level is determined based on at least one of a determined energy on each of the plurality of resources or on information decoded from the signals received on the plurality of resources.

9. The apparatus of claim 6, wherein the means for adjusting the duty cycle:
   reduces the duty cycle when the determined congestion level is greater than a first threshold; and
   increases the duty cycle when the determined congestion level is less than a second threshold.

10. The apparatus of claim 6, wherein the means for adjusting the duty cycle is further based on a transmission priority, the transmission priority comprises a plurality of priority levels, and the duty cycle is adjusted differently based on an assigned transmission priority of the plurality of priority levels.

11. An apparatus for wireless communication, comprising:
    a processing system configured to:
    determine a resource congestion level based on signals received on a plurality of resources of a peer discovery channel;
    adjust a duty cycle of a peer discovery transmission based on the determined congestion level on the resources of the peer discovery channel and based on an intended range of peer-to-peer communications between the wireless communication device and a second wireless communication device that receives the peer discovery transmission, wherein the duty cycle is a fraction of peer discovery resource occurrences utilized within a period to repeatedly transmit a peer discovery signal; and
    transmit the peer discovery signals for the intended range at the adjusted duty cycle, wherein the transmitted peer discovery signals include information indicating the adjusted duty cycle, the period at which the resource of the peer discovery channel allocated to the apparatus repeats, and an offset from a reference frame that indicates when the period begins for a first peer discovery transmission.

12. The apparatus of claim 11, wherein the congestion level is determined based on at least one of a determined energy on each of the plurality of resources or on information decoded from the signals received on the plurality of resources.

13. The apparatus of claim 11, wherein to adjust the duty cycle, the processing system is configured to:
    reduce the duty cycle when the determined congestion level is greater than a first threshold; and
    increase the duty cycle when the determined congestion level is less than a second threshold.

14. The apparatus of claim 11, wherein the processing system is configured to adjust the duty cycle further based on a transmission priority, the transmission priority comprises a plurality of priority levels, and the duty cycle is adjusted differently based on an assigned transmission priority of the plurality of priority levels.

15. A non-transitory computer readable medium storing computer executable code for wireless communication, comprising code for:
   determining a resource congestion level based on signals received on a plurality of resources of a peer discovery channel;
   adjusting a duty cycle of a peer discovery transmission based on the determined congestion level on the resources of the peer discovery channel and based on an intended range of peer-to-peer communications between the wireless communication device and a second wireless communication device that receives the peer discovery transmission, wherein the duty cycle is a fraction of peer discovery resource occurrences utilized within a period to repeatedly transmit a peer discovery signal; and
   transmitting the peer discovery signals for the intended range at the adjusted duty cycle, wherein the transmitted peer discovery signals include information indicating the adjusted duty cycle, the period at which the resource of the peer discovery channel allocated to the device repeats, and an offset from a reference frame that indicates when the period begins for a first peer discovery transmission.

16. The computer readable medium of claim 15, wherein the congestion level is determined based on at least one of a determined energy on each of the plurality of resources or on information decoded from the signals received on the plurality of resources.

17. The computer readable medium of claim 15, wherein the code for adjusting the duty cycle:
   reduces the duty cycle when the determined congestion level is greater than a first threshold; and
   increases the duty cycle when the determined congestion level is less than a second threshold.

18. The computer readable medium of claim 15, wherein the code for adjusting the duty cycle adjusts the duty cycle further based on a transmission priority, the transmission priority comprises a plurality of priority levels, and the duty cycle is adjusted differently based on an assigned transmission priority of the plurality of priority levels.

19. A method of operating a wireless communication device, comprising:
   determining a resource congestion level based on signals received on a plurality of resources of a peer discovery channel;
   adjusting a duty cycle of a peer discovery transmission based on the determined congestion level, wherein the duty cycle is a fraction of peer discovery resource occurrences utilized within a period to repeatedly transmit a peer discovery signal; and
   transmitting the peer discovery signals at the adjusted duty cycle, wherein the transmitted peer discovery signals include information indicating the adjusted duty cycle, the period at which the resource of the peer discovery channel allocated to the wireless communication device repeats, and an offset that indicates when the period begins for a first peer discovery transmission;
   wherein the adjusting the duty cycle comprises:
   reducing the duty cycle when the determined congestion level is greater than a first threshold; and
   increasing the duty cycle when the determined congestion level is less than a second threshold,
   wherein the first threshold and the second threshold are based on a transmission priority assigned to the device or to the transmitted peer discovery signal.

20. An apparatus for wireless communication, comprising:
   means for determining a resource congestion level based on signals received on a plurality of resources of a peer discovery channel;
   means for adjusting a duty cycle of a peer discovery transmission based on the determined congestion level, wherein the duty cycle is a fraction of peer discovery resource occurrences utilized within a period to repeatedly transmit a peer discovery signal; and
   means for transmitting the peer discovery signals at the adjusted duty cycle, wherein the transmitted peer discovery signals include information indicating the adjusted duty cycle, the period at which the resource of the peer discovery channel allocated to the apparatus repeats, and an offset that indicates when the period begins for a first peer discovery transmission,
   wherein the means for adjusting the duty cycle:
   reduces the duty cycle when the determined congestion level is greater than a first threshold; and
   increases the duty cycle when the determined congestion level is less than a second threshold,
   wherein the first threshold and the second threshold are based on a transmission priority assigned to the apparatus or to the transmitted peer discovery signal.

21. An apparatus for wireless communication, comprising:
   a processing system configured to:
   determine a resource congestion level based on signals received on a plurality of resources of a peer discovery channel;
   adjust a duty cycle of a peer discovery transmission based on the determined congestion level, wherein the duty cycle is a fraction of peer discovery resource occurrences utilized within a period to repeatedly transmit a peer discovery signal; and
   transmit the peer discovery signals at the adjusted duty cycle, wherein the transmitted peer discovery signals include information indicating the adjusted duty cycle, the period at which the resource of the peer discovery channel allocated to the apparatus repeats, and an offset that indicates when the period begins for a first peer discovery transmission,
   wherein to adjust the duty cycle, the processing system is configured to:
   reduce the duty cycle when the determined congestion level is greater than a first threshold; and
   increase the duty cycle when the determined congestion level is less than a second threshold,
   wherein the first threshold and the second threshold are based on a transmission priority assigned to the apparatus or to the transmitted peer discovery signal.

22. A non-transitory computer readable medium storing computer executable code for wireless communication, comprising code for:
   determining a resource congestion level based on signals received on a plurality of resources of a peer discovery channel;
   adjusting a duty cycle of a peer discovery transmission based on the determined congestion level, wherein the duty cycle is a fraction of peer discovery resource occurrences utilized within a period to repeatedly transmit a peer discovery signal; and transmitting the peer discovery signals at the adjusted duty cycle, wherein the transmitted peer discovery signals include information indicating the adjusted duty cycle, the period at which the resource of the peer discovery channel allocated to the device repeats, and an offset that indicates when the period begins for a first peer discovery transmission, wherein the code for adjusting the duty cycle:

reduces the duty cycle when the determined congestion level is greater than a first threshold; and increases the duty cycle when the determined congestion level is less than a second threshold, wherein the first threshold and the second threshold are based on a transmission priority assigned to the device or to the transmitted peer discovery signal.

23. A method of operating a wireless communication device, comprising:

determining a resource congestion level based on signals received on a plurality of resources of a peer discovery channel;

adjusting a duty cycle of a peer discovery transmission based on the determined congestion level, wherein the duty cycle is a fraction of peer discovery resource occurrences utilized within a period to repeatedly transmit a peer discovery signal; and transmitting the peer discovery signals at the adjusted duty cycle, wherein the transmitted peer discovery signals include information indicating the adjusted duty cycle, the period at which the resource of the peer discovery channel allocated to the wireless communication device repeats, and an offset that indicates when the period begins for a first peer discovery transmission, wherein the adjusting the duty cycle comprises:

reducing the duty cycle when the determined congestion level is greater than a first threshold; and increasing the duty cycle when the determined congestion level is less than a second threshold, wherein the first threshold and the second threshold are a function of at least one of a periodicity or the duty cycle.

24. An apparatus for wireless communication, comprising:

means for determining a resource congestion level based on signals received on a plurality of resources of a peer discovery channel;

means for adjusting a duty cycle of a peer discovery transmission based on the determined congestion level, wherein the duty cycle is a fraction of peer discovery resource occurrences utilized within a period to repeatedly transmit a peer discovery signal; and means for transmitting peer discovery signals at the adjusted duty cycle, wherein the transmitted peer discovery signals include information indicating the adjusted duty cycle, the period at which the resource of the peer discovery channel allocated to the apparatus repeats, and an offset that indicates when the period begins for a first peer discovery transmission, wherein the means for adjusting the duty cycle:

reduces the duty cycle when the determined congestion level is greater than a first threshold; and increases the duty cycle when the determined congestion level is less than a second threshold, wherein the first threshold and the second threshold are a function of at least one of a periodicity or the duty cycle.

25. An apparatus for wireless communication, comprising:

a processing system configured to:

determine a resource congestion level based on signals received on a plurality of resources of a peer discovery channel;

adjust a duty cycle of a peer discovery transmission based on the determined congestion level, wherein the duty cycle is a fraction of peer discovery resource occurrences utilized within a period to repeatedly transmit a peer discovery signal; and transmit the peer discovery signals at the adjusted duty cycle, wherein the transmitted peer discovery signals include information indicating the adjusted duty cycle, the period at which the resource of the peer discovery channel allocated to the apparatus repeats, and an offset that indicates when the period begins for a first peer discovery transmission, wherein to adjust the duty cycle, the processing system is configured to:

reduce the duty cycle when the determined congestion level is greater than a first threshold; and increase the duty cycle when the determined congestion level is less than a second threshold, wherein the first threshold and the second threshold are a function of at least one of a periodicity or the duty cycle.

26. A non-transitory computer readable medium storing computer executable code for wireless communication, comprising code for:

determining a resource congestion level based on signals received on a plurality of resources of a peer discovery channel;

adjusting a duty cycle of a peer discovery transmission based on the determined congestion level, wherein the duty cycle is a fraction of peer discovery resource occurrences utilized within a period to repeatedly transmit a peer discovery signal; and transmitting the peer discovery signals at the adjusted duty cycle, wherein the transmitted peer discovery signals include information indicating the adjusted duty cycle and the period at which the resource of the peer discovery channel allocated to the device repeats, and an offset that indicates when the period begins for a first peer discovery transmission, wherein the code for adjusting the duty cycle:

reduces the duty cycle when the determined congestion level is greater than a first threshold; and increases the duty cycle when the determined congestion level is less than a second threshold, wherein the first threshold and the second threshold are a function of at least one of a periodicity or the duty cycle.

* * * * *